(12) United States Patent
Deng et al.

(10) Patent No.: US 12,462,827 B2
(45) Date of Patent: *Nov. 4, 2025

(54) INTELLIGENT NOISE SUPPRESSION FOR AUDIO SIGNALS WITHIN A COMMUNICATION PLATFORM

(71) Applicant: Zoom Video Communications, Inc., San Jose, CA (US)

(72) Inventors: Jiachuan Deng, Mountain View, CA (US); Qiyong Liu, Santa Clara, CA (US); Chuanfei Wang, Zhejiang (CN); Xiuyu Xu, Zhejiang (CN)

(73) Assignee: Zoom Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/115,636

(22) Filed: Feb. 28, 2023

(65) Prior Publication Data

US 2023/0206938 A1    Jun. 29, 2023

Related U.S. Application Data

(63) Continuation of application No. 17/390,915, filed on Jul. 31, 2021, now Pat. No. 11,621,016.

(51) Int. Cl.
*G10L 21/0232* (2013.01)
*G06N 3/08* (2023.01)
*G06N 7/01* (2023.01)
*G10L 25/18* (2013.01)
(Continued)

(52) U.S. Cl.
CPC ............ *G10L 21/0232* (2013.01); *G06N 3/08* (2013.01); *G06N 7/01* (2023.01); *G10L 25/18* (2013.01); *G10L 25/30* (2013.01); *G10L 25/51* (2013.01)

(58) Field of Classification Search
CPC ..... G10L 21/0232; G10L 25/18; G10L 25/30; G10L 25/51; G06N 7/01; G06N 3/08
See application file for complete search history.

(56) References Cited

U.S. PATENT DOCUMENTS 8,781,137 B1 * 7/2014 Goodwin ............ G10L 21/0208
381/94.1
10,440,324 B1 * 10/2019 Lichtenberg ........ H04L 65/1104
10,446,170 B1 * 10/2019 Chen ...................... G06N 20/00
(Continued)

*Primary Examiner* — Olisa Anwah
(74) *Attorney, Agent, or Firm* — Kilpatrick Townsend & Stockton, LLP

(57) ABSTRACT

Methods and systems provide users of a communication platform with intelligent, real-time noise suppression for audio signals broadcasted in a communication session. The system receives an input audio signal from an audio capture device; processes the input audio signal to provide a second version of the audio signal with noise suppression based on DSP techniques; transmits the second version of the audio signal to a communication platform for real-time streaming; classifies, via a machine learning algorithm, whether the second version of the audio signal contains noise beyond a noise threshold; based on a classification that the second version of the audio signal contains noise beyond the noise threshold, processes the second version of the audio signal to provide a third version of the audio signal with noise suppression based on AI techniques; and transmits the third version of the audio signal to the communication platform.

20 Claims, 7 Drawing Sheets

(51) Int. Cl.
*G10L 25/30* (2013.01)
*G10L 25/51* (2013.01)

(56) References Cited

U.S. PATENT DOCUMENTS

| | | | | |
|---|---|---|---|---|
| 11,727,926 | B1* | 8/2023 | Liu | G10L 21/0232 |
| | | | | 704/232 |
| 2013/0163781 | A1* | 6/2013 | Thyssen | G10L 25/51 |
| | | | | 381/94.1 |
| 2016/0049915 | A1* | 2/2016 | Wang | G10L 21/0364 |
| | | | | 381/107 |
| 2016/0056787 | A1* | 2/2016 | Lu | H04S 7/307 |
| | | | | 381/101 |
| 2017/0186442 | A1 | 6/2017 | Cahill et al. | |
| 2018/0301157 | A1* | 10/2018 | Gunawan | G10L 21/034 |
| 2019/0066654 | A1* | 2/2019 | Dickins | G10K 11/17853 |
| 2019/0244627 | A1* | 8/2019 | Sapozhnykov | H04R 3/00 |
| 2020/0184996 | A1* | 6/2020 | Steele | H04R 5/00 |
| 2021/0110840 | A1* | 4/2021 | Chu | G06N 3/08 |
| 2021/0118462 | A1* | 4/2021 | Tommy | G10L 21/02 |
| 2021/0151065 | A1* | 5/2021 | Lindstrom | G10L 25/84 |
| 2021/0356502 | A1* | 11/2021 | Enouy | G06F 17/141 |
| 2021/0360349 | A1* | 11/2021 | Nyayate | G10L 25/84 |
| 2021/0400384 | A1* | 12/2021 | Ye | G10L 21/0216 |
| 2022/0020386 | A1* | 1/2022 | Vanapalli | G10L 21/0208 |
| 2022/0021970 | A1* | 1/2022 | Vilermo | H04R 1/406 |
| 2022/0051652 | A1* | 2/2022 | Winsvold | G10K 11/17885 |
| 2022/0051687 | A1* | 2/2022 | Sendoda | G10L 25/24 |
| 2022/0059112 | A1* | 2/2022 | Iyer | G06N 20/00 |
| 2022/0262336 | A1* | 8/2022 | Truong | G10K 11/17873 |
| 2022/0270638 | A1 | 8/2022 | Zhang et al. | |
| 2022/0295189 | A1* | 9/2022 | Sahgal | H04R 25/356 |
| 2022/0369031 | A1* | 11/2022 | Lester | G10L 21/028 |
| 2023/0026735 | A1* | 1/2023 | Montazeri | G10L 21/0208 |
| 2023/0267947 | A1* | 8/2023 | Shuang | G10L 21/0316 |
| | | | | 704/233 |
| 2023/0290367 | A1* | 9/2023 | Yeh | G10L 21/0232 |
| | | | | 704/233 |

\* cited by examiner

INTELLIGENT NOISE SUPPRESSION FOR AUDIO SIGNALS WITHIN A COMMUNICATION PLATFORM

CROSS-REFERENCE TO RELATED APPLICATIONS

This application is a continuation of U.S. Non-Provisional application Ser. No. 17/390,915, filed on Jul. 31, 2021, which is hereby incorporated by reference in its entirety.

FIELD OF INVENTION

The present invention relates generally to digital media, and more particularly, to systems and methods for providing intelligent noise suppression for audio signals within a communication platform.

BACKGROUND

Digital communication tools and platforms have been essential in providing the ability for people and organizations to communicate and collaborate remotely, e.g., over the internet. In particular, there has been massive adopted use of communication platforms allowing for remote video sessions between multiple participants. Communications applications for casual friendly conversation ("chat"), webinars, large group meetings, work meetings or gatherings, asynchronous work or personal conversation, and more have exploded in popularity.

Due to the nature of remote communications between two or more parties, participants may be connected from a variety of locations, including, for example, from their home, from a café, or outdoors. Since unintended noise may be a factor in many such locations, it is beneficial for such communication platforms to include some form of automatic noise suppression to be performed on the audio signals that participants are broadcasting to one another. "Low resource" noise suppression, which uses established digital signal processing ("DSP") techniques, is relatively efficient and low-cost in terms of central processing unit ("CPU") resources. It is typically used to filter out stationary noises from an audio signal, such as white noise or pink noise which may be audible in the background of the audio broadcast. Non-stationary noises, however, such as dogs barking or babies crying, are not effectively filtered out using low resource DSP techniques.

BRIEF DESCRIPTION OF THE DRAWINGS

The present invention relates generally to digital communication, and more particularly, to systems and methods providing for containment of sensitive data within a communication or messaging platform.

The present disclosure will become better understood from the detailed description and the drawings, wherein.

DETAILED DESCRIPTION

Figure 1A:
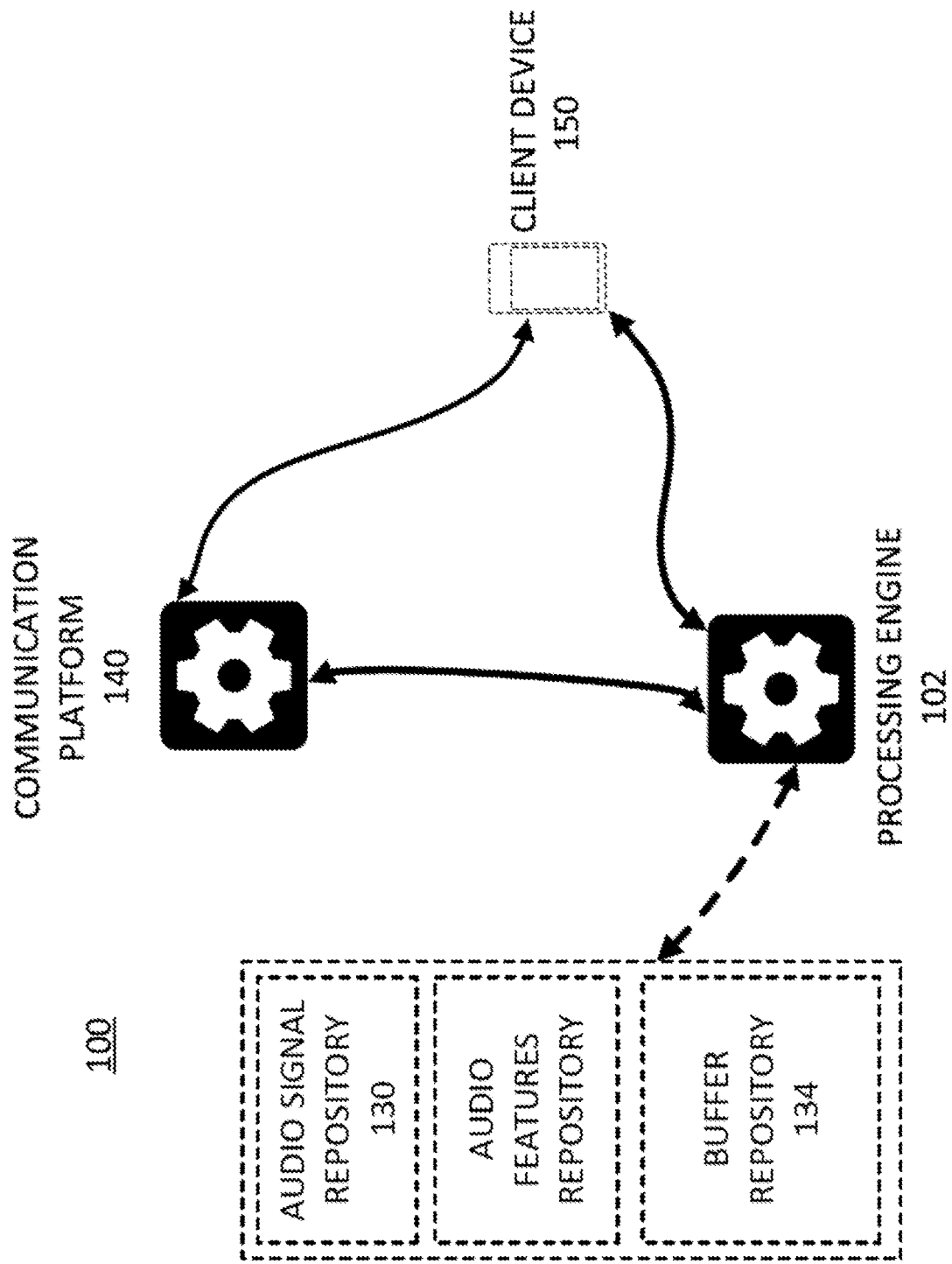
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Video and/or audio communication over a computer network has existed and has increasingly played a significant role in the modern workplace. There are various components (local and remote) that work in unison to implement a video and/or audio communication platform. Typical video and/or audio communication applications include, e.g., a client-side application that can run on a desktop, laptop, smart phone or similar stationary or mobile computing device. Such client-side applications can be configured to capture audio and/or video, and transmit them to a recipient computer or receiving client device.

Some embodiments are implemented by a computer system. A computer system may include a processor, a memory, and a non-transitory computer-readable medium. The memory and non-transitory medium may store instructions for performing methods and steps described herein.

There is a need in the field of digital media to create a new and useful system and method for providing intelligent noise suppression for audio signals within a communication platform. The source of the problem, as discovered by the inventors, is a lack of ability for AI-based noise suppression to be performed in a way that uses CPU resources very efficiently and enables processing to be performed on a client device, in real-time or substantially real-time upon unwanted noise being heard.

The systems and methods herein overcome the existing problems by providing users of a communication platform with intelligent noise suppression for audio signals, particularly if they are participating in a live-streaming communication session featuring audio streams, and potentially video streams, from participants. In such a scenario, noise suppression must be performed on outgoing audio signals being streamed in real-time or substantially real-time to other participants within the communication session. The systems and methods relate to processing the input audio signal to provide a second version of the audio signal with noise suppression based on DSP techniques, as a first stage of processing to filter out background noises well-suited to be handled by DSP-based noise suppression (e.g., stationary noise, white noise, pink noise, computer fan noise, and other forms of ambient background noise). After the first stage of processing, the second version of the audio signal is broadcast for streaming. A classification is then performed to determine whether the processed audio still contains noise beyond a noise threshold. If it does, then a second stage of processing is performed on the audio signal to provide a third version with noise suppression based on AI techniques. Such AI-based noise suppression can typically handle much more kinds of noises, including, e.g., non-stationary noises and unexpected sharp peaks in the audio signals (e.g., dogs barking, babies crying, and loud drilling or other construction noises). This third version of the audio signal is then transmitted for streaming to the communication platform.

In one embodiment, the system receives an input audio signal from an audio capture device; processes the input audio signal to provide a second version of the audio signal with noise suppression based on DSP techniques; transmits the second version of the audio signal to a communication platform for real-time streaming; classifies, via a machine learning algorithm, whether the second version of the audio signal contains noise beyond a noise threshold; based on a classification that the second version of the audio signal contains noise beyond the noise threshold, processes the second version of the audio signal to provide a third version of the audio signal with noise suppression based on AI techniques; and transmits the third version of the audio signal to the communication platform.

In some embodiments, the classification step involves first extracting audio features from the input audio signal (which is a raw waveform), then transmitting those audio features to a neural network. The audio features are then processed via the neural network to provide a probability of whether the second version of the audio signal contains noise beyond the noise threshold.

In some additional embodiments, a spectrogram is generated based on the extracted audio features. The spectrogram is transmitted to the neural network, which then processes the spectrogram to provide the probability of whether the second version of the audio signal contains noise beyond the noise threshold.

In some embodiments, the classification step involves the system generating an "output label" which includes the classification result for a section (e.g., a predetermined segment) of the audio signal after a predefined time interval has expired. The system then stores the output label within a buffer. The buffer contains a number of output labels that have been generated over a predefined window of time.

Further areas of applicability of the present disclosure will become apparent from the remainder of the detailed description, the claims, and the drawings. The detailed description and specific examples are intended for illustration only and are not intended to limit the scope of the disclosure.

I. Exemplary Environments

FIG. 1A is a diagram illustrating an exemplary environment in which some embodiments may operate. In the exemplary environment 100, a user's client device is connected to a processing engine 102 and, optionally, a communication platform 140. The processing engine 102 is connected to the communication platform 140, and optionally connected to one or more repositories and/or databases, including an audio signal repository 130, audio features repository 132, and/or a buffer repository 134. One or more of the databases may be combined or split into multiple databases. The user's client device 150 in this environment may be a computer, and the communication platform server 140 and processing engine 102 may be applications or software hosted on a computer or multiple computers which are communicatively coupled via remote server or locally.

The exemplary environment 100 is illustrated with only one user's client device, one processing engine, and one communication platform, though in practice there may be more or fewer client devices, processing engines, and/or communication platforms. In some embodiments, the client device, processing engine, and/or communication platform may be part of the same computer or device.

Figure 2:
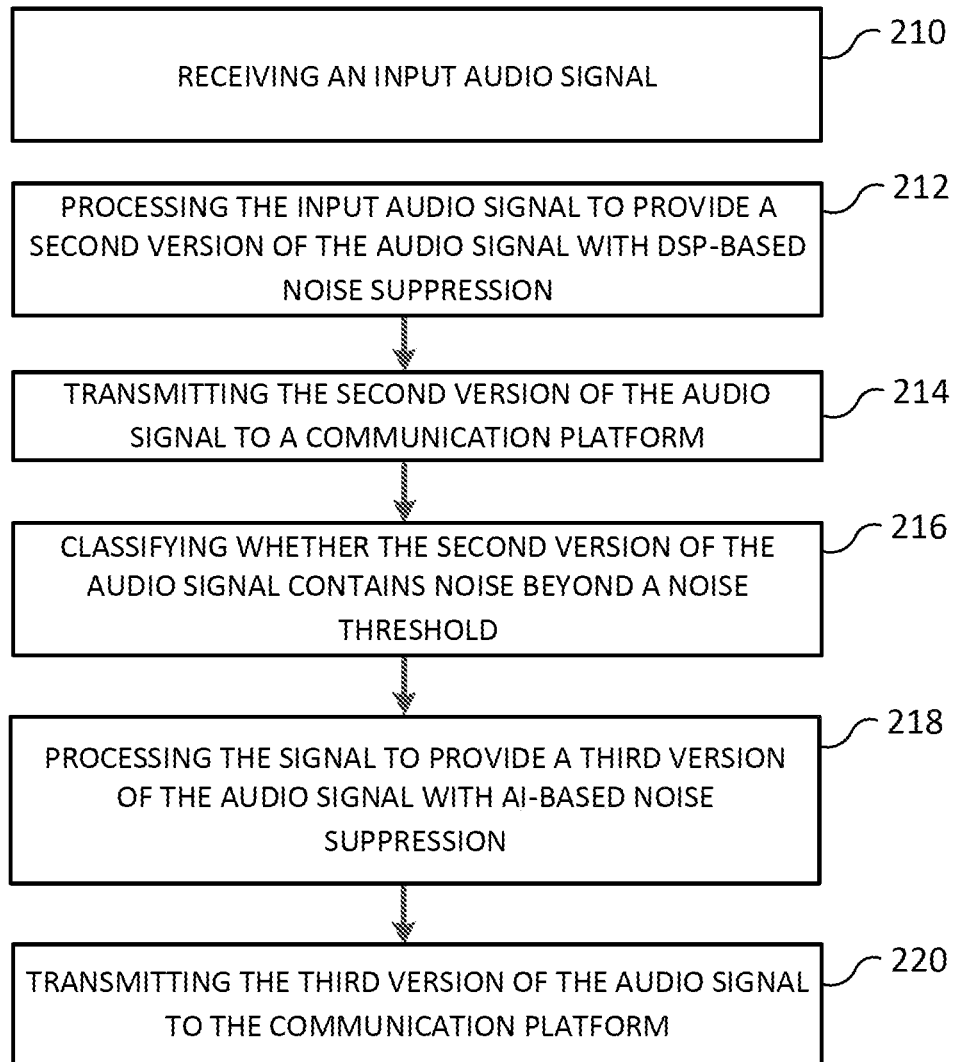
FIG. 2 is a flow chart illustrating an exemplary method for providing intelligent noise suppression for audio signals within a communication platform, in accordance with some embodiments.

In an embodiment, the processing engine 102 may perform the exemplary method of FIG. 2 or other method herein and, as a result, provide intelligent noise suppression for an audio signal within a communication platform. In some embodiments, this may be accomplished via communication with the user's client device, processing engine, communication platform, and/or other device(s) over a network between the device(s) and an application server or some other network server. In some embodiments, the processing engine 102 is an application, browser extension, or other piece of software hosted on a computer or similar device, or is itself a computer or similar device configured to host an application, browser extension, or other piece of software to perform some of the methods and embodiments herein. In some embodiments, a server computer may be running one or more processing engines and/or communication platforms among a large plurality of instances of processing engines and/or communication platforms in a data center, cloud computing environment, or other mass computing environment. There also may be hundreds, thousands or millions of client devices.

The user's client device 150 is a device configured to send and receive signals and information between the client device, processing engine 102, and communication platform 140. The client device includes a display configured to present information to a user of the device, and a means of producing an audio output (via, e.g., built-in speakers or headphones or speakers connected via an audio output jack, Bluetooth, or some other method of producing audio output). The client device 140 includes a means of capturing audio. In some embodiments, the client device also includes a means of capturing video. Audio and/or video may be captured via one or more built-in capture components, or external devices configured to capture audio and/or video and transmit them to the client device. In some embodiments, the client device presents, via the display, information in the form of a user interface (UI) with multiple selectable UI elements or components.

In some embodiments, the client device is a computing device capable of hosting and executing one or more applications or other programs capable of sending and/or receiving information. In some embodiments, the client device may be a computer desktop or laptop, mobile phone, tablet computer, virtual assistant, virtual reality or augmented reality device, wearable, or any other suitable device capable of sending and receiving information. In some embodiments, the processing engine 102 and/or communication platform 140 may be hosted in whole or in part as an application or web service executed on the client device 150. In some embodiments, one or more of the communication platform 140, processing engine 102, and client device 150 may be the same device. In some embodiments, the user's client device 150 is associated with a user account within a communication platform.

In some embodiments, the client device 150 hosts a communication application that allows the client device 150 to communicate with the processing engine 102 and communication platform 140. In an embodiment, the communication platform 140 and/or one or more databases may maintain a number of user accounts, each associated with one or more client device(s) 150 and/or one or more users of the client device(s).

Among other functions, the communication application running on a client device can capture audio and transmit it to the processing engine 102. The audio signal is generally captured having a variety of characteristics and parameters. The audio signal captured by the client device is converted into a digital audio signal.

In some embodiments, optional repositories can include one or more of an audio signal repository 130, audio features repository 132, and/or buffer repository 134. The optional repositories function to store and/or maintain, respectively, audio signals and/or information associated with a communication session on the communication platform 140, audio features extracted from the audio signals, and buffers which store audio signals, output labels for whether audio signals are noisy or not (described further below), and/or other related information within a communication platform. The optional database(s) may also store and/or maintain any other suitable information for the processing engine 102 or communication platform 140 to perform elements of the methods and systems herein. In some embodiments, the optional database(s) can be queried by one or more components of system 100 (e.g., by the processing engine 102), and specific stored data in the database(s) can be retrieved.

Communication platform 140 is a platform configured to facilitate audio and/or video communication between two or more parties, such as within a conversation, audio and/or video conference or meeting, message board or forum, messaging environment (such as, e.g., a "chat room"), virtual meeting, or other form of digital communication. The communication session may be one-to-many (e.g., a speaker presenting to multiple attendees), one-to-one (e.g., two friends speaking with one another), or many-to-many (e.g., multiple participants speaking with each other in a group video setting). In some embodiments, the communication platform 140 hosts a communication session, and transmits and receives video, image, and/or audio data to and from the client device 150.

Figure 1B:
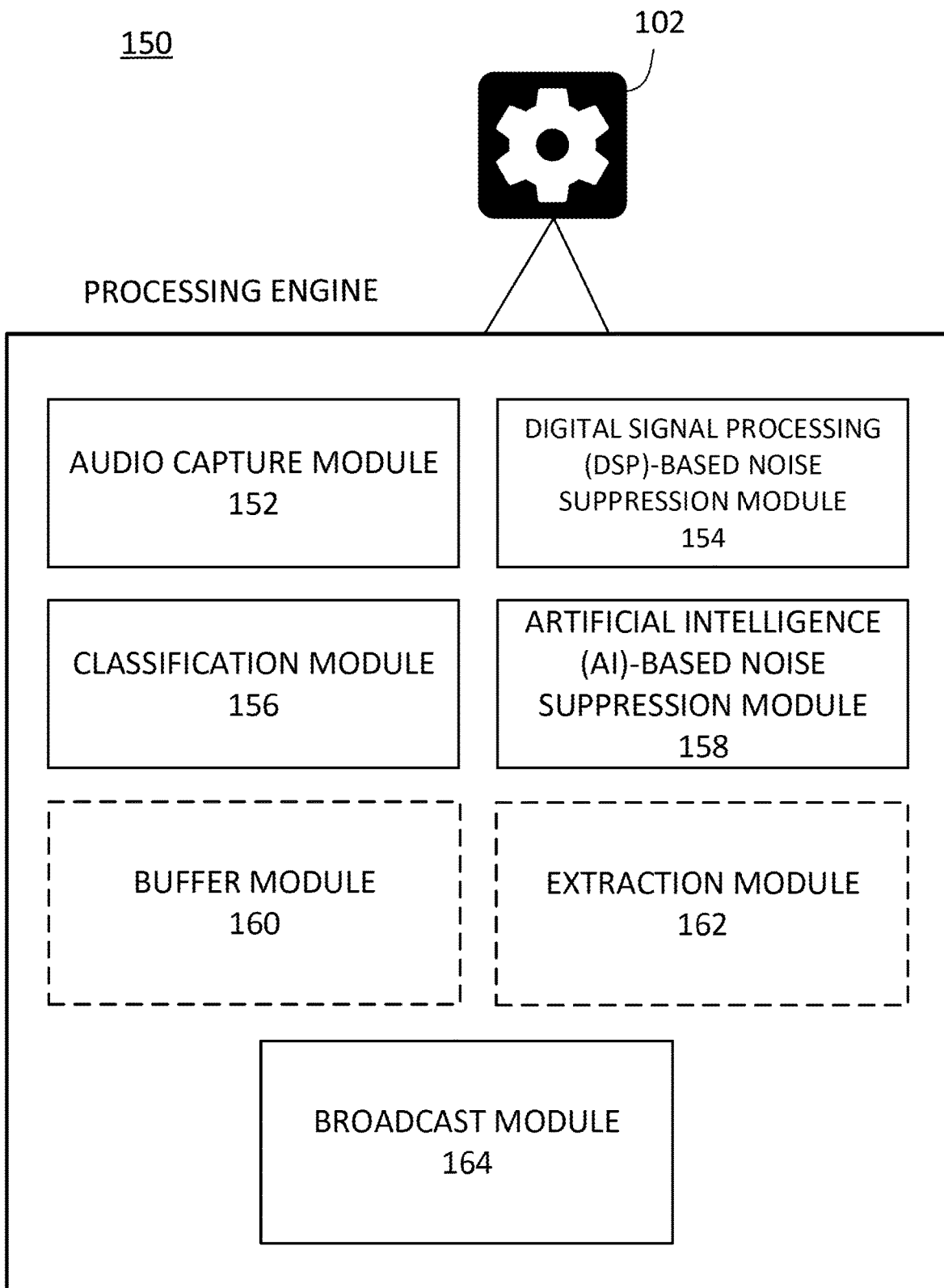
FIG. 1B is a diagram illustrating an exemplary computer system that may execute instructions to perform some of the methods herein.

FIG. 1B is a diagram illustrating an exemplary computer system 150 with software modules that may execute some of the functionality described herein.

Audio capture module 152 functions to capture audio signals from the client device or one or more connected capture devices, and transmit the audio signals to the processing engine 102 for processing and/or communication platform 140 for broadcasting within a communication session.

DSP-based noise suppression module 154 functions to perform noise suppression processing on an input audio signal via DSP methods and techniques.

Classification module 160 functions to classify an audio signal as noisy or not noisy based on a predefined noise threshold.

AI-based noise suppression module 158 functions to perform noise suppression processing on an input audio signal via AI-based methods and techniques.

Optional buffer module 160 functions to maintain one or more buffers configured to store audio signals, output labels for whether audio signals are noisy or not, and/or other information.

Optional extraction module 162 functions to extract one or more audio features from an input audio signal.

Broadcast module 164 functions to broadcast one or more audio signals to be heard on one or more client devices connected to a communication session via a communication platform.

The above modules and their functions will be described in further detail in relation to an exemplary method below.

II. Exemplary Method

FIG. 2 is a flow chart illustrating an exemplary method that may be performed in some embodiments.

At step 210, the system receives an input audio signal from an audio capture device. In some embodiments, the audio capture device may be the client device, an audio capture device connected to the client device, or some other audio capture device. In some embodiments, the system receives an input audio signal by the audio capture device transmitting the audio signal to a processing engine 102. For example, the client device may be a smartphone which is configured to capture (i.e., record) an audio signal via an internal microphone and transmit the captured audio signal to the processing engine 102. In some embodiments, the input audio signal is stored in cloud storage or other remote repository. In other embodiments, the input audio signal may be stored locally on the client device.

At step 212, the system processes the input audio signal to provide a second version of the audio signal with noise suppression based on digital signal processing (DSP) techniques. Such DSP techniques for noise suppression may include, but are not limited to, e.g.: noise gates, masking, filtering (e.g., high-pass, low-pass, or band-pass filters, notch filters, dynamic filtering, Wiener filtering), attenuation, expansion, oversampling, side-chaining, multi-band dynamic processing, Fast Fourier Transform ("FFT") processes, gain control, echo cancellation, and spectral processing. In some embodiments, the processing is performed wholly or in part on a remote server. In some embodiments, DSP-based noise suppression techniques may be subtractive in nature, i.e., configured to identify particular frequencies with higher levels of background noise and subtracting those bands from the original input audio signal. In some embodiments, a "fingerprint" (i.e., a short representative segment, such as a 1-second sample) of the noise may be extracted from the audio signal. The fingerprint is then analyzed and used to set one or more noise thresholds automatically. In some embodiments, a dynamic noise profile may be generated based on the input audio signal. In some embodiments, auto-correlation can be applied to identify constants present in the varying audio signal. In some embodiments, one or more narrow-band notch filters can be applied and tuned to the fundamental frequencies and harmonics present in the audio spectrum.

In some embodiments, the system generates a spectrogram based on the raw waveform of the input signal. A spectrogram is a representation of the input signal that shows the variation of the frequency spectrum over time. In some embodiments, the spectrogram presents the audio signal as frequency changes over time, with the different frequencies within the audio signal being presented along with the signal amplitude over time. The spectrogram is transmitted to the neural network, and the neural network analyzes the spectrogram, as will be described in further detail below.

At step 214, the system transmits the second version of the audio signal to a communication platform for real-time streaming. In some embodiments, the communication platform is fully or partly local to a client device, while in some embodiments the communication platform is fully or partly located on a remote server. In some embodiments, the processing in step 212 as well as the transmission in step 214 is performed in real-time or substantially real-time upon the system receiving an input audio signal. The processed audio signal can thus be heard in real-time or substantially real-time by participants of the communication session shortly after the raw audio signal is captured. Participants to the stream of audio in the communication session will thus hear the second version of the audio signal, rather than the first, originally captured version with significantly more noise present.

Figures 3A, 3B:
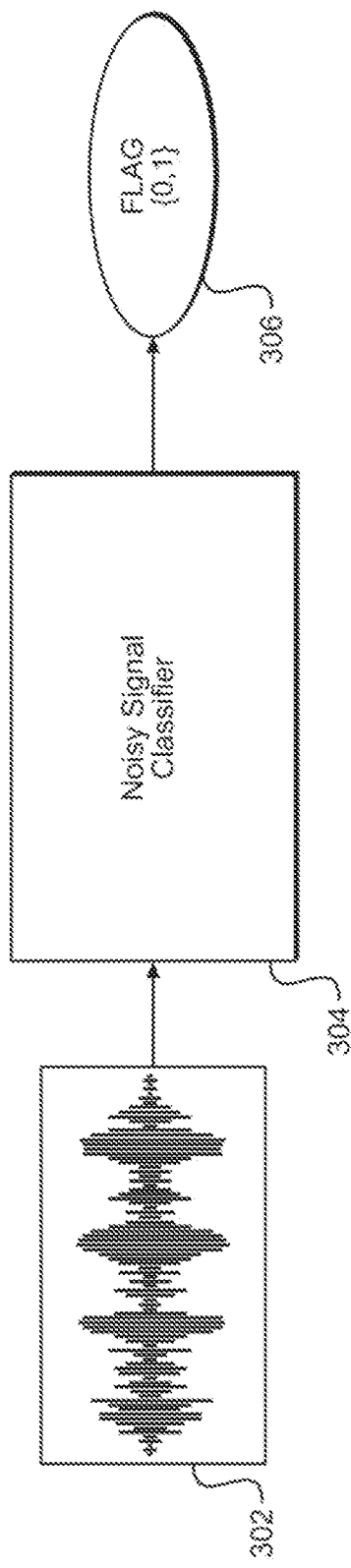
FIG. 3A is a flow chart illustrating one example embodiment of identifying a noisy audio signal.
FIG. 3B is a chart illustrating an example of CPU usage comparison between a Noisy Signal Classifier and AI-based noise suppression techniques, in accordance with some embodiments.
Figure 4:
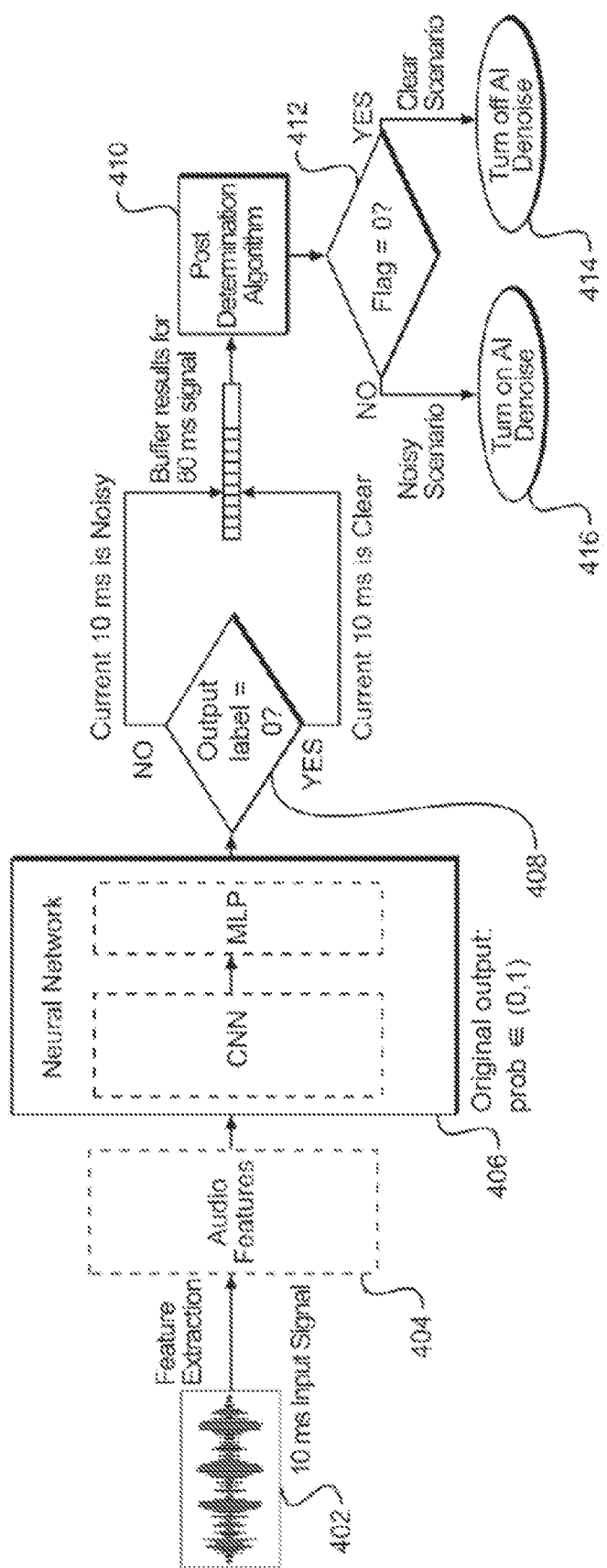
FIG. 4 is a flow chart illustrating one example embodiment of a Noisy Signal Classifier.

At step 216, the system classifies, via a machine learning algorithm, whether the second version of the audio signal contains noise beyond a noise threshold. This step is used to classify whether the audio signal in question is to be considered a "noisy scenario" or not. This classification, in turn, can be used to determine whether the system should be directed to proceed or not proceed with AI-based noise suppression to further remove noise, if possible. In some embodiments, the classification of whether a noisy signal is present or not present can be solved with a deep learning-based model with very low computational cost. In some embodiments, this model, which is hereinafter referred to as the Noisy Signal Classifier, generates a binary output label at regular intervals (e.g., every 80 milliseconds). If the value of the output label is 1, then the system has determined that a noisy signal is present such that the level of noise exceeds a noise threshold that has been set. If the value of the output label is 0, then the system has determined that the audio signal is clear of noise such that the level of noise does not exceed a noise threshold that has been set. One example embodiment of the Noisy Signal Classifier is illustrated in FIG. 3A as a high level overview. An example of CPU usage comparison between the Noisy Signal Classifier and AI-based noise suppression techniques is illustrated in FIG. 3B. Finally with respect to the Noisy Signal Classifier, a more detailed flow chart of an example embodiment of a Noisy Signal Classifier is illustrated in FIG. 4.

FIG. 3A is a flow chart illustrating one example embodiment of identifying a noisy audio signal, according to some embodiments of step 216 in FIG. 2. First, a processed audio signal 302 is present. The processed audio signal 302 is the result of low resource DSP-based noise suppression techniques being performed on an input audio signal This processed version of the input audio signal is transferred to a Noisy Signal Classifier 304. The processed audio signal 302 is transferred to the Noisy Signal Classifier 304 at regular, constant or near-constant intervals (for example, every 10 milliseconds). A binary FLAG 306 is output from the Noisy Signal Classifier 304. The binary FLAG may provide a result of either 0 or 1, signaling (respectively) either a non-noisy, clear scenario or a noisy scenario.

FIG. 3B is a chart illustrating an example of CPU usage comparison between a Noisy Signal Classifier and AI-based noise suppression techniques, in accordance with some embodiments. A chart 308 illustrates the computer processing unit ("CPU") usage of the Noisy Signal Classifier compared to the AI Denoise Model, e.g., AI-based noise suppression techniques. The Noisy Signal Classifier expends a lightweight 0.57% of available CPU, while the AI Denoise Model expends a far more significant 3.5% of available CPU.

Typically, conservation of CPU usage has been a significant challenge when deploying an AI-based noise suppression model. This is especially the case when deploying the model on low-end devices such as a mobile phone or a personal PC, rather than on cloud services that can leverage large amounts of processing power. Since many users of communication platforms work from home or in office environments, most users tend to broadcast from environments where background noise can largely be handled with low resource DSP-based noise suppression techniques. For example, in one scenario, over 80% of audio broadcasts can be handled with such DSP-based techniques, i.e., the noise was reduced to an acceptably low level using these techniques such that it did not extend past a predefined noise threshold. Therefore, CPU usage can be minimized by handling most cases with DSP-based noise suppression techniques, without ever needing to deploy AI-based noise suppression techniques. The system must be able to identify whether there is a noisy scenario or not after DSP-based techniques are used to process the audio, and then activate AI-based noise suppression when there is.

Handling this process of identification via the Noisy Signal Classifier is a much computationally simpler task than removing the background noise with AI-based noise suppression in every scenario, as illustrated in the chart comparing CPU usage of the Noisy Signal Classifier to CPU usage of AI-based noise suppression techniques. The Noisy Signal Classifier is computationally simpler because when trying to remove background noise via AI-based techniques, there are hundreds of thousands of sample points which need to be predicted within the audio signal. In contrast, if the system only needs to classify if the signal is noisy or not, the system just needs to deploy a model with a binary output, i.e., a classification flag of 0 or 1, representing noisy or not noisy.

An additional challenge stems from the AI-based noise suppression techniques often needing to be deployed immediately or near-immediately after unwanted background noise is heard, e.g., as quickly as possible after a baby starts crying. This is particularly the case during live broadcasting of audio. Since the Noisy Signal Classifier involves much lower CPU usage than AI-based noise suppression techniques, it is much more feasible for the Noisy Signal Classifier to be running constantly during a given communication session, in comparison to an AI noise suppression model to be running constantly. Thus, the Noisy Signal Classifier can run constantly in the background during a session, while the AI noise suppression model can be deployed only in circumstances where there is a noisy audio signal still present after DSP-based techniques are deployed.

FIG. 4 is a flow chart illustrating one example embodiment of a Noisy Signal Classifier, in accordance with some embodiments. Whereas the flow chart in FIG. 3A illustrates the flow of the Noisy Signal Classifier at a high level, the flow chart in FIG. 4 illustrates the flow of the Noisy Signal Classifier in a more detailed fashion.

At step 402, an input audio signal is captured from an audio capture device and received by the system. In some embodiments, the input signal is a raw waveform that has not yet been processed. In some embodiments, the input signal is received in segments. In this example, a 10 millisecond input signal is received from the audio capture device. In some embodiments, the input signal is received in larger sections and the system segments the larger sections into smaller divisions.

At step 404, the system extracts one or more audio features from the input signal's raw waveform. In various embodiments, audio features that are extracted may include, e.g., pitch along the time domain, frequency domain, and/or cepstral domain, spectral peaks and/or any harmonic relationships between them, and Mel-frequency cepstral coefficients ("MFCC"). In some embodiments, one or more features may be extracted and then a spectrogram, such as, e.g., a Mel or Log-Mel spectrogram, or a Short-Time Fourier Transform ("STFT") spectrogram may be generated based on those audio features. In some embodiments, speech features, such as phonetic features of speech may be extracted in order to distinguish the speaker from background noise which does not share the audio properties of speech.

At step 406, the system sends the extracted audio features to a neural network. The neural network receives the audio features, analyzes them, and outputs a probability output label of 0 or 1 based on a prediction of whether there is a noisy signal present in the audio or not. In one embodiment, as illustrated, the neural network is a hybrid neural network consists of a convolutional neural network ("CNN") and a multilayer perceptron ("MLP"). That is, the neural network model may deploy a CNN at the input and an MLP at the output, with the output of the CNN feeding into the MLP, in order to ingest an audio signal and generate a classification prediction for it. Other embodiments may include one or more differing types of neural networks or neural network architectures. For example, recurrent neural networks ("RNN") or long short-term memory ("LSTM") networks may be deployed. In one embodiment, the combination of a CNN, LSTM network, and MLP may be deployed for a given neural network architecture. Generally, a more elaborate neural network structure will result in better prediction performance, but the CPU cost will be higher, so a neural network architecture must be chosen to balance out these competing interests.

In some embodiments, a noise threshold is used to determine the generated output label. For example, if there is a probability (i.e., confidence that the input segment contains noise beyond an acceptable level) higher than 0.5, then the generated output label may be 1, whereas if the probability is lower than 0.5, then the generated output label may be 0. In some embodiments, the noise threshold is predetermined based on set levels of noise that are considered acceptable. In other embodiments, the noise threshold may be dynamic depending on one or more factors or preferences for the communication session.

At step 408, based on a determination of whether the output label is 0 or not, i.e., whether the current segment of input audio is clear or noisy, the output label is stored in a different section of a buffer which stores the results for a predefined number of output labels. In this example, the buffer stores results for 80 milliseconds of signal. In other words, eight different 10 millisecond segments of the input audio signal are received as inputs into the Noisy Signal Classifier, and eight corresponding binary output labels are generated and stored in the same buffer. Upon a ninth binary output label being generated which corresponds to a ninth 10 millisecond segment, a new buffer is generated and the ninth binary output label is stored there. This continues as long as the input audio stream continues, with buffers storing output labels for each 80 milliseconds of input audio signal. In other examples, the buffer may store, e.g., 100 milliseconds or 60 milliseconds.

At step 410, the system deploys a post determination algorithm to analyze the past output labels which have been stored in the latest full buffer (i.e., in this example, the buffer storing 8 output labels representing 80 milliseconds of input audio). Based on this analysis, the algorithm determines if the latest full buffer has stored output labels which suggest a clear scenario or instead a noisy scenario. The output labels as a whole produce a FLAG result of 0 or 1 depending on if there is a noisy scenario or not. These flags are used to create a more confident result for whether to deploy AI-based noise suppression techniques or leave them undeployed.

As step 412, the deployed post determination algorithm uses the previous results of output labels within the latest full buffer to whether a noisy scenario is present. In some embodiments, if most or all output labels amount to an output of 0 then the system moves to step 414, the clear scenario, and leaves the AI-based noise suppression techniques (i.e., the AI Denoise module) undeployed. On the other hand, if most or all output labels amount to an output of 1, then the system moves to step 416, the noisy scenario, and deploys AI-based noise suppression techniques. In some embodiments, algorithms are used to determine results based on the results of the output labels within the latest full buffer, rather than directly analyzing whether any one output label's value is 1. In such a scenario, a series of output labels [0, 1, 0, 0, 0, 1, 0, 0] may result in a determination of a clear scenario, and a series of output labels [0, 0, 0, 0, 0, 0, 0, 0] may also result in a determination of a clear scenario. Despite the presence of some output labels with an output of 1, the overall determination may still be a clear scenario. This is because the model might mistakenly produce false flags for whether a noisy signal is present. Since the output labels are mostly 0, the system may make the determination that the 1s in the past 8 frames are mistakes rather than showing there is a noisy signal overall for that buffer. Likewise, a buffer with output labels reading [0, 1, 1, 1, 1, 0, 1, 1] may result in a determination of a noisy scenario. The 0s present could be mistakes as well, or may reflect a clear scenario being present for a very short time. Thus, the system may determine the signal overall to be noisy for that buffer.

Returning to FIG. 2, at step 218, based on a classification that the second version of the audio signal contains noise beyond the noise threshold, i.e., the result of step 416 in FIG. 4 has been reached and AI-based noise suppression techniques have been deployed, the system processes the second version of the audio signal to provide a third version of the audio signal with noise suppression based on AI techniques. AI-based noise suppression techniques may include, but are not limited to, e.g.: deep learning-based methods, neural networks, AI algorithms trained on one or more training datasets (e.g., datasets filled with samples of, for example, background chatter, air conditioning, typing, dogs barking, or traffic), RNNs, LSTMs, gated recurrent units ("GRUs"), hybrid approaches combining low resource DSP-based techniques with AI-based techniques, or any other suitable techniques which involve methods of AI-based noise suppression.

In some embodiments, following the completion of the processing based on AI-based noise suppression techniques, one or more other DSP-based algorithms are deployed to process the resulting third version of the audio. Such other forms of DSP processing may include, e.g., gain control and/or compression.

At step 220, the system transmits the third version of the audio signal to the communication platform. In some embodiments, the system transmits this third version as an audio package to a network which hosts or communicates with the communication platform for relaying audio streams to the communication session so that participants can hear one another. In some embodiments, the third version of the audio signal is streamed in real-time or substantially real-time upon the initial raw waveform being captured by the audio capture device, such that participants experience as little delay as possible between audio being captured and the resulting processed audio being heard. For example, during real-time conferencing with multiple participants, the participants will hear the speech from other participants with noise suppression applied (i.e., either low resource DSP-based noise suppression or a combination of both low resource and AI-based noise suppression), with the speech still corresponding to the lip movements seen on video for those participants.

Figure 5:
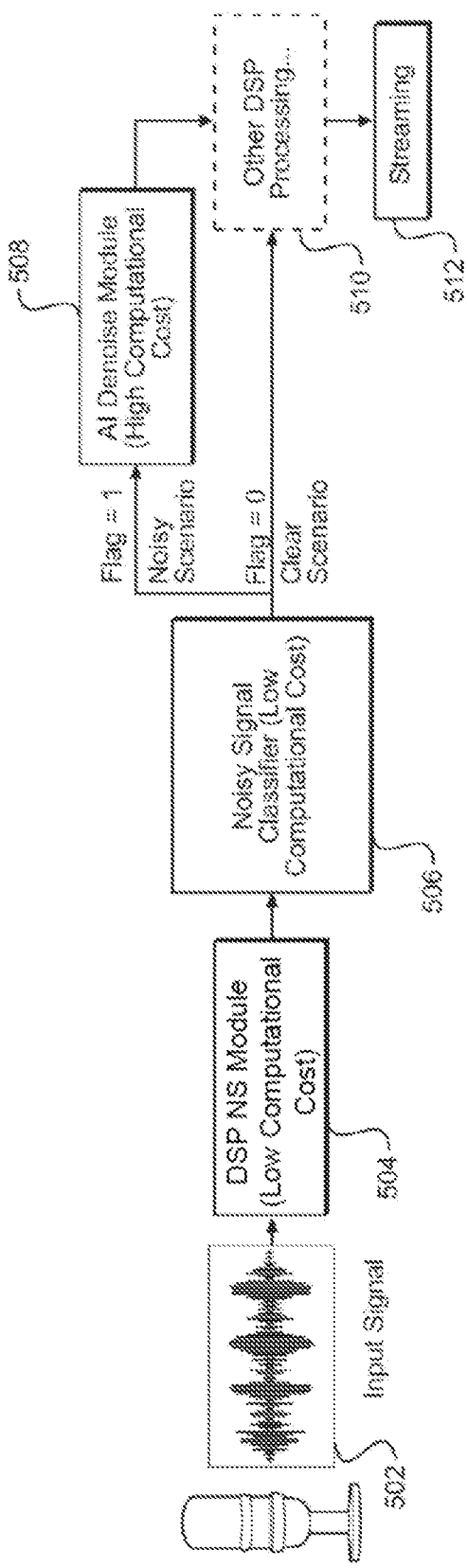
FIG. 5 is a flow chart illustrating one example embodiment of an AI-based noise suppression pipeline.

FIG. 5 is a flow chart illustrating one example embodiment of an AI-based noise suppression pipeline. The flow chart shows a high-level overview of the systems and methods herein. At step 502, the system receives an input audio signal from an audio capture device. In some embodiments, audio features are extracted from this input audio signal and used in step 504. At step 504, the system deploys a low resource DSP-based noise suppression module with low computational cost, using the captured input audio signal as input (and optionally, extracted audio features from the input audio signal) and processing it. The result of this module is a second version of the audio waveform with DSP-based noise suppression applied. At step 506, the second version of the audio waveform is used as input to a Noisy Signal Classifier with low computational cost, which produces an output in the form of a binary flag of 0 (representing a clear scenario below a noise threshold) or 1 (representing a noisy scenario at or above a noise threshold). In some embodiments, a buffer stores a set amount of binary output labels produced, with multiple new buffers being generated and filled with binary output labels while audio signal continues to be captured. The Noisy Signal Classifier continually runs and produces binary flags for as long as the audio signal continues to be captured and used in an audio stream.

At step 508, the AI Denoise Module is deployed with a high computational cost, using the second version of the audio waveform as input. This AI Denoise Module includes deployment of one or more AI-based noise suppression techniques to produce a third version of the audio waveform with AI-based noise suppression techniques applied. At step 510, other DSP processing may be optionally applied to the third version of the audio waveform to produce a fourth audio waveform. At step 512, the resulting audio waveform is transmitted as an audio package to the communication network, to be streamed for participants of a communication session.

Figure 6:
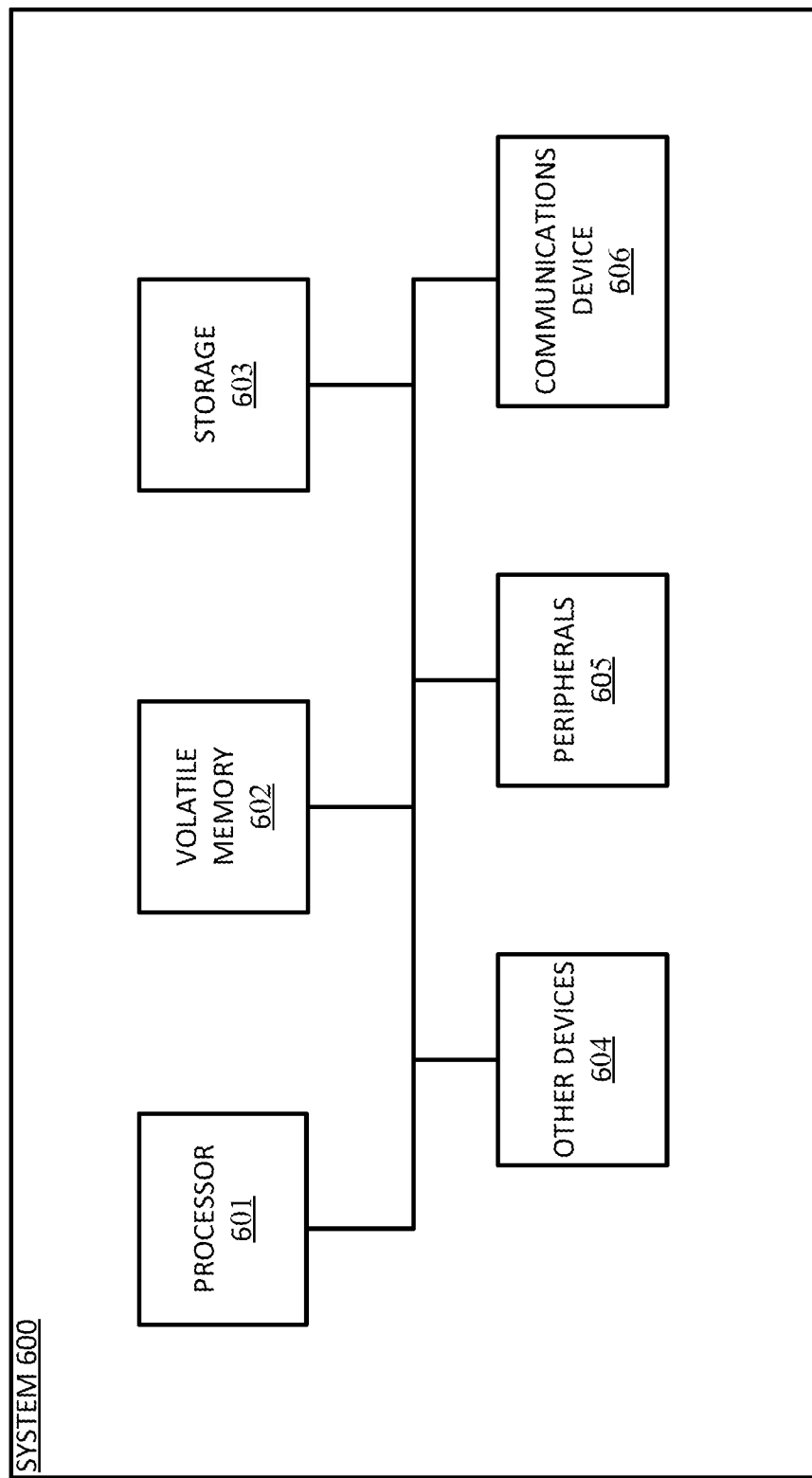
FIG. 6 is a diagram illustrating an exemplary computer that may perform processing in some embodiments.

FIG. 6 is a diagram illustrating an exemplary computer that may perform processing in some embodiments. Exemplary computer 600 may perform operations consistent with some embodiments. The architecture of computer 600 is exemplary. Computers can be implemented in a variety of other ways. A wide variety of computers can be used in accordance with the embodiments herein.

Processor 601 may perform computing functions such as running computer programs. The volatile memory 602 may provide temporary storage of data for the processor 601. RAM is one kind of volatile memory. Volatile memory typically requires power to maintain its stored information. Storage 603 provides computer storage for data, instructions, and/or arbitrary information. Non-volatile memory, which can preserve data even when not powered and including disks and flash memory, is an example of storage. Storage 603 may be organized as a file system, database, or in other ways. Data, instructions, and information may be loaded from storage 603 into volatile memory 602 for processing by the processor 601.

The computer 600 may include peripherals 605. Peripherals 605 may include input peripherals such as a keyboard, mouse, trackball, video camera, microphone, and other input devices. Peripherals 605 may also include output devices such as a display. Peripherals 605 may include removable media devices such as CD-R and DVD-R recorders/players. Communications device 606 may connect the computer 100 to an external medium. For example, communications device 606 may take the form of a network adapter that provides communications to a network. A computer 600 may also include a variety of other devices 604. The various components of the computer 600 may be connected by a connection medium such as a bus, crossbar, or network.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method for providing intelligent noise suppression for an audio signal within a communication platform, comprising:
    classifying, using a first machine learning algorithm, whether the audio signal contains noise beyond a noise threshold based on a binary classification, comprising:
    generating a binary output comprising the classification after a predefined time interval has expired; and
    storing the binary output within a buffer, the buffer corresponding to a predefined window of time and configured to store a predefined number of binary outputs;
    determining that the binary outputs within the buffer correspond to a likelihood that the audio signal contains noise beyond the noise threshold using a post-classification smoothing technique; and
    processing the audio signal via a second machine learning algorithm trained to suppress noise to provide another version of the audio signal.

2. The method of claim 1, wherein the audio signal provides suppression of stationary noises, and wherein the another version of the audio signal provides suppression of both stationary and non-stationary noises.

3. The method of claim 1, wherein classifying, using the first machine learning algorithm, whether the audio signal contains noise beyond the noise threshold based on the binary classification comprises:
    extracting a plurality of audio features from the audio signal, wherein the audio signal is a raw waveform;
    transmitting the audio features to a neural network; and
    analyzing the audio features via the neural network to provide a probability of whether the audio signal contains noise beyond the noise threshold.

4. The method of claim 3, further comprising:
    generating a spectrogram based on the extracted audio features, wherein transmitting the audio features to the neural network comprises transmitting the spectrogram to the neural network, and
    wherein analyzing the audio features via the neural network comprises analyzing the spectrogram.

5. The method of claim 1, wherein classifying whether the audio signal contains noise beyond the noise threshold further comprises performing one or more feature-based classification techniques.

6. The method of claim 5, wherein classifying whether the audio signal contains noise beyond the noise threshold further comprises:
    determining that the predefined window of time has expired;
    generating a confidence score for the predefined number of binary outputs stored within the buffer; and
    based on the confidence score, determining whether the audio signal meets or exceeds the noise threshold.

7. A non-transitory computer-readable medium containing instructions for providing intelligent noise suppression for an audio signal within a communication platform, comprising:
    classifying, using a first machine learning algorithm, whether the audio signal contains noise beyond a noise threshold based on a binary classification, comprising:
    generating a binary output comprising the classification after a predefined time interval has expired; and
    storing the binary output within a buffer, the buffer corresponding to a predefined window of time and configured to store a predefined number of binary outputs;
    determining that the binary outputs within the buffer correspond to a likelihood that the audio signal contains noise beyond the noise threshold using a post-classification smoothing technique; and
    processing the audio signal via a second machine learning algorithm trained to suppress noise to provide another version of the audio signal.

8. The non-transitory computer-readable medium of claim 7, wherein the audio signal provides suppression of stationary noises, and wherein the another version of the audio signal provides suppression of both stationary and non-stationary noises.

9. The non-transitory computer-readable medium of claim 7, wherein classifying, using the first machine learning algorithm, whether the audio signal contains noise beyond the noise threshold based on the binary classification comprises:
    extracting a plurality of audio features from the audio signal, wherein the audio signal is a raw waveform;
    transmitting the audio features to a neural network; and
    analyzing the audio features via the neural network to provide a probability of whether the audio signal contains noise beyond the noise threshold.

10. The non-transitory computer-readable medium of claim 9, further comprising instructions of:
    generating a spectrogram based on the extracted audio features, wherein transmitting the audio features to the neural network comprises transmitting the spectrogram to the neural network; and
    wherein analyzing the audio features via the neural network comprises analyzing the spectrogram.

11. The non-transitory computer-readable medium of claim 9, wherein classifying whether the audio signal contains noise beyond the noise threshold further comprises performing one or more feature-based classification techniques.

12. The non-transitory computer-readable medium of claim 11, wherein classifying whether the audio signal contains noise beyond the noise threshold further comprises:
   determining that the predefined window of time has expired;
   generating a confidence score for the plurality of predefined number of binary outputs stored within the buffer; and
   based on the confidence score, determining whether the audio signal meets or exceeds the noise threshold.

13. A communication system comprising one or more processors configured to perform the operations of:
   classifying, using a first machine learning algorithm, whether an audio signal contains noise beyond a noise threshold based on a binary classification, comprising:
      generating a binary output comprising the classification after a predefined time interval has expired; and
      storing the binary output within a buffer, the buffer corresponding to a predefined window of time and configured to store a predefined number of binary outputs;
   determining that the binary outputs within the buffer correspond to a likelihood that the audio signal contains noise beyond the noise threshold using a post-classification smoothing technique; and
   processing the audio signal via a second machine learning algorithm trained to suppress noise to provide another version of the audio signal.

14. The communication system of claim 13, wherein the audio signal provides suppression of stationary noises, and wherein the another version of the audio signal provides suppression of both stationary and non-stationary noises.

15. The communication system of claim 13, wherein classifying, using the first machine learning algorithm, whether the audio signal contains noise beyond the noise threshold based on the binary classification comprises:
   extracting a plurality of audio features from the audio signal, wherein the audio signal is a raw waveform;
   transmitting the audio features to a neural network; and
   analyzing the audio features via the neural network to provide a probability of whether the audio signal contains noise beyond the noise threshold.

16. The communication system of claim 15, further comprising the operations of:
   generating a spectrogram based on the extracted audio features, wherein transmitting the audio features to the neural network comprises transmitting the spectrogram to the neural network; and
   wherein analyzing the audio features via the neural network comprises analyzing the spectrogram.

17. The communication system of claim 13, wherein classifying whether the audio signal contains noise beyond the noise threshold further comprises performing one or more feature-based classification techniques.

18. The method of claim 1, wherein the post-classification smoothing technique involves:
   determining one or more aggregate characteristics of the predefined number of binary outputs within the buffer, based on a distribution of binary outputs within the buffer;
   determining a mistake likelihood for each of the predefined number of binary outputs within the buffer, based on the distribution of binary outputs within the buffer; and
   determining that the audio signal contains noise beyond the noise threshold based on the aggregate characteristics and the mistake likelihood.

19. The non-transitory computer-readable medium of claim 7, wherein the post-classification smoothing technique involves:
   determining one or more aggregate characteristics of the predefined number of binary outputs within the buffer, based on a distribution of binary outputs within the buffer;
   determining a mistake likelihood for each of the predefined number of binary outputs within the buffer, based on the distribution of binary outputs within the buffer; and
   determining that the audio signal contains noise beyond the noise threshold based on the aggregate characteristics and the mistake likelihood.

20. The communication system of claim 13, wherein the post-classification smoothing technique involves:
   determining one or more aggregate characteristics of the predefined number of binary outputs within the buffer, based on a distribution of binary outputs within the buffer;
   determining a mistake likelihood for each of the predefined number of binary outputs within the buffer, based on the distribution of binary outputs within the buffer; and
   determining that the audio signal contains noise beyond the noise threshold based on the aggregate characteristics and the mistake likelihood.

* * * * *